Patented June 20, 1950

2,512,307

UNITED STATES PATENT OFFICE 2,512,307

ESTERS OF DI-SUBSTITUTED ACETIC ACIDS AND SULFUR CONTAINING TERTIARY AMINO ALKANOLS

Raymond O. Clinton, Albany County, and Wolfgang Huber, Kings County, N. Y., and George M. Fohlen, Philadelphia County, Pa., and Stanley C. Laskowski, Albany County, N. Y., assignors to Sterling Drug Inc., Wilmington, Del., a corporation of Delaware No Drawing. Application July 24, 1948, Serial No. 40,614

9 Claims. (Cl. 260—469)

This invention relates to basic esters derived from disubstituted-acetic acids and sulfur-containing tertiary-aminoalkanols, to addition salts thereof, and to methods of preparing said basic esters.

We have found that basic compounds having the following formula exhibit useful pharmacological properties:

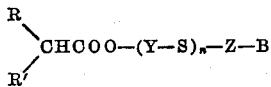

where R and R' are aryl, aralkyl, or cycloalkyl radicals; Y and Z are lower alkylene radicals; $n$ is 1 to 2; and B is a lower aliphatic tertiary-amino group.

In the above formula the groups designated as R and R', which can be the same or different, are each radicals of preferably 3–10 carbon atoms. When R and R' are either aryl or aralkyl, the radicals can be nuclearly-substituted by groups such as alkoxyl, including methoxyl and ethoxyl, etc., lower alkyl such as methyl and ethyl, etc., halo, amino, alkylamino, dialkylamino, and the like. When R or R' are cycloalkyl, such radicals as cyclohexyl, cyclopentyl, 2-methylcyclohexyl, cyclopropyl, and the like are included. In addition, R and R', when aryl, can be linked in ortho positions, either directly to form the fluorene ring or though a bridge involving such elements as carbon, nitrogen, oxygen, and sulfur to form the rings of 9,10-dihydroanthracene, acridan, xanthene, and thioxanthene, respectively. The lower alkylene radicals, designated by Y and Z, preferably have 2 to 4 carbon atoms, including such groups as —CH₂CH₂—, —CH₂CH₂CH₂—, —CH₂CH₂CH₂CH₂—, and

The lower aliphatic tertiary-amino group, shown above as B, comprehends lower dialkylamino groups illustrated by examples such as dimethylamino, diethylamino, ethylmethylamino, di-n-butylamino, and the like; and lower saturated N-heterocyclic groups illustrated by examples such as 1-piperidyl, 2-methyl-1-piperidyl, 1-pyrrolidyl, 4-morpholinyl, and the like. In other words, BH designates a lower aliphatic secondary-amine as illustrated by diethylamine, di-n-butylamine, 2,6-dimethylpiperidine, and the like.

Specific illustrations of our invention follow:

(1) 3 - (2 - dimethylaminoethylmercapto) - 2-propyl diphenylacetate,

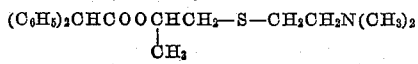

(2) 3 - (3 - (1 - piperidyl) propylmercapto) - 2-propyl fluorene-9-carboxylate,

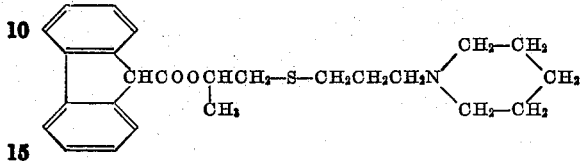

(3) 2 - (2 - diethylaminoethylmercapto) ethyl 9,10-dihydro-9-anthroate,

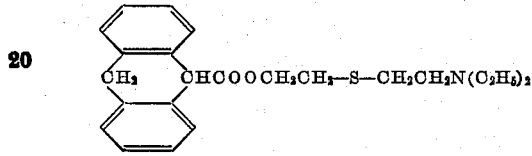

(4) 3 - (2 - (2 - methyl-1-piperidyl) ethylmercapto) -2-propyl cyclohexylphenylacetate,

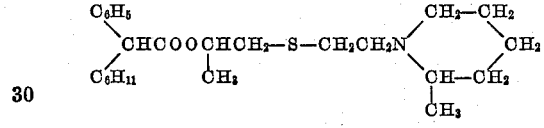

(5) 2 - (3 - diethylaminopropylmercapto) ethyl dibenzylacetate,

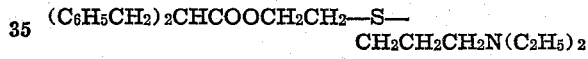

In practicing our invention we prepared our basic esters by one of two general methods: (a) reaction of a di-substituted-acetyl halide of the formula R(R')CHCO-halogen with the appropriate basic alcohol of the formula,

where R, R', B, Z, Y, and $n$ have the meanings specified hereinabove; or (b) reaction of a lower alkyl ester of a di-substituted-acetic acid of the formula, R(R')CHCOO—(lower alkyl), with the basic alcohol of the formula, B—Z—(S—Y)ₙOH, where R, R', B, Z, Y, and $n$ have the meanings specified hereinabove, preferably in the presence of a basic catalyst, such as sodium or a sodium alkoxide. While method (b) is preferably run in the presence of a basic catalyst, this method is also operable in the absence of such a catalyst.

In the preparation of the basic esters of our invention using procedure (a), little or no heat is needed to carry out the reaction. In fact, prolonged heating of the sulfur-containing amino alcohols with the di-substituted-acetyl halides may produce mixtures from which no crystalline substance can be obtained. In many instances the reaction between the acid halide and the alcohol may result in the deposition of the hydrochloride in a form which resists crystallization, or which if crystallized is found to be hygroscopic. However the sometimes inconvenient physical properties of these hydrochlorides in the solid state do not preclude their effective preparation and use in solution, and in fact the high solubility of these hydrochlorides is often advantageous. Where solid crystalline salts of convenient physical properties are desired, we have found the citrates to be suitable. These are prepared by treating a solution of the free basic ester with an equivalent of citric acid monohydrate.

Preparation of the intermediate sulfur-containing tertiary-aminoalkanols are described in the literature by Clinton et al., J. Am. Chem. Soc. 67, 594 (1945) and ibid. 69, 519 (1947).

We found it convenient to isolate and use the basic esters of our invention as the water-soluble citric acid salts or hydrochloric acid addition salts. It is, of course, understood that other water-soluble salts, such as those derived from other non-toxic organic acids, including tartaric acid, succinic acid, and the like, and other non-toxic inorganic acids, including hydrobromic acid, sulfuric acid, phosphoric acid, and the like, have equivalent therapeutic efficacy and are within the scope of our invention.

Also comprehended by our invention are the quaternary salts of our basic esters, said salts being derived from esters of strong inorganic acids and organic sulfonic acids, and such esters including methyl bromide, ethyl sulfate, n-propyl iodide, benzyl chloride, methyl para-toluenesulfonate, and the like.

The following examples illustrate specific embodiments of the invention.

Example 1

2 - (2 - *diethylaminoethylmercapto*) *ethyl diphenylacetate hydrochloride.*—To an ice-cooled solution of benzene containing 13.0 g. (0.0565 mole) of diphenylacetyl chloride and 100 ml. of dry benzene is added during a five minute period with shaking a cold solution of 10.0 g. (0.0565 mole) of 2-(2-diethylaminoethylmercapto) ethanol in 50 ml. of dry benzene. The clear solution is warmed for fifteen minutes on the steam bath and then cooled. After addition of about 500 ml. of petroleum ether (n-pentane fraction), there separates an oil which crystallizes on cooling and triturating. Three recrystallizations of this material from ethyl acetate results in 15.8 g. of large white prisms, M. P. 94–5° C. This product is 2 - (2 - diethylaminoethylmercapto) ethyl diphenylacetate hydrochloride.

When the above procedure is used, but substituting 3 - (2 - (2-methyl-1-piperidyl) ethylmercapto)-2-propanol for 2-(2-diethylaminoethylmercapto) ethanol, there is formed, as the final product, 3 - (2-(2-methyl-1-piperidyl) ethylmercapto)-2-propyl diphenylacetate hydrochloride.

Example 2

3- (2 - *diethylaminoethylmercapto*) *propyl diphenylacetate citrate.*—The condensation of 3-(2-diethylaminoethylmercapto) propanol and diphenylacetyl chloride is carried out as described in Example 1. The crude crystalline hydrochloride (M. P. ca. 21° C.) is converted to the free base with ammonia and the free base extracted with ethyl acetate. The dried ethyl acetate solution of the base is treated with a slight excess of citric acid monohydrate in absolute ethanol solution. The resulting citrate is recrystallized from absolute ethanol-ethyl acetate to give an 87% yield of 3-(2-diethylaminoethylmercapto) propyl diphenylacetate citrate, M. P. 112.5–3.0° C.

Other esters of diphenylacetic acid can be prepared according to the above procedure if, in place of 3-(2-diethylaminoethylmercapto)propanol, other corresponding basic sulfur-containing alcohols are utilized. Thus, by using as the basic alcohols, 3-(2-dimethylaminoethylmercapto)-2-propanol and 2-(2-dimethylaminoethylmercapto) ethanol, and, further, by substituting dry ether for benzene as the reaction solvent, there is obtained, respectively, 3-(2-dimethylaminoethylmercapto)- 2- propyl diphenylacetate citrate, M. P. 65–70° C. (recrystallized from acetone), and 2-(2-dimethylaminoethylmercapto)-ethyl diphenylacetate citrate, M. P. 73–5° C. (recrystallized from acetone.

Further, there also can be prepared basic esters of the above type, but containing more than one sulfur atom in the alcohol portion of the esters. For example, if the above procedure is carried out, but using as the basic alcohol 2-(2-(2-diethylaminoethylmercapto) ethylmercapto) ethanol, the resulting product is 2-(2-(2-diethylaminoethylmercapto) ethylmercapto) ethyl diphenylacetate citrate, a waxy white crystalline compound melting at 87–9° C. after recrystallization from acetone.

Example 3

2 - (2 - *diethylaminoethylmercapto*) *ethyl dibenzylacetate citrate.*—A mixture of 10 g. (0.042 mole) of dibenzylacetic acid, 30 ml. of thionyl chloride, and 60 ml. of chloroform is refluxed for about two and one-half hours. The excess solvent and thionyl chloride are removed as completely as possible by in vacuo distillation using a water pump and a hot water bath. The residual dibenzylacetyl chloride is dissolved in 25 ml. of dry benzene; the solution is cooled in ice water; and a solution of 7.4 g. (0.042 mole) of 2-(2-diethylaminoethylmercapto) ethanol in 25 ml. of dry benzene is slowly added with shaking. After the resulting mixture has been allowed to warm up to room temperature and stand at that temperature for about two hours, it is then refluxed on the water bath for twenty minutes. The cooled benzene solution is washed several times with cold 40% potassium carbonate solution and dried over anhydrous sodium sulfate. The residual oil after removing the benzene amounts to 16.2 g.; this is dissolved in 25 ml. of dry acetone, and the solution is treated with a solution of 8.4 g. of citric acid monohydrate in about 35 ml. of dry acetone. The white, voluminous precipitate is filtered and recrystallized from acetone to yield 17.4 g. (71%) of 2-(2-diethylaminoethylmercapto) ethyl dibenzylacetate citrate, M. P. 95–101° C.

If the above procedure is followed, but using ether as the reaction solvent in place of benzene and 2 - (3-(1-piperidyl)propylmercapto)ethanol or 2-(3-diethylaminopropylmercapto)ethanol as the basic sulfur-containing alcohol, there is obtained, respectively, 2-(3-(1-piperidyl)propylmercapto)ethyl dibenzylacetate citrate, M. P. 67–70° C., or 2-(3-diethylaminopropylmercapto)ethyl dibenzylacetate citrate, M. P. 94–7° C.

The above esters also can be prepared from a lower alkyl dibenzylacetate instead of dibenzylacetyl chloride. For example, 2-(2-diethylaminoethylmercapto)ethyl dibenzylacetate citrate is prepared by refluxing for several hours equimolar amounts of methyl dibenzylacetate and 2-(2-diethylaminoethylmercapto)ethanol in the presence of a small amount of sodium in petroleum ether (fraction of mixed octanes), adding an equal volume of benzene, washing the mixture with water, drying the same over anhydrous sodium sulfate, removing the solvents, and treating the residual oil as described in Example 3 above. This preparation also can be carried out by using sodium ethoxide as the basic catalyst in place of sodium or by using no basic catalyst.

Example 4

3-(2-*dimethylaminoethylmercapto*)*propyl fluorene* - 9 - *carboxylate citrate*.—Fluorene-9-carboxylic acid is esterified with methanol by bubbling hydrogen chloride through a solution of the acid in methanol. The resulting methyl fluorene-9-carboxylate distills at 223–6° C. at 40 mm. and melts at 63° C.

A mixture of 5 g. (0.02 mole) of methyl fluorene-9-carboxylate 4.3 g. (0.026 mole) of 3-(2-dimethylaminoethylmercapto)propanol, and 0.1 g. (0.005 mole) of sodium metal in 200 ml. of petroleum ether (fraction of mixed octanes) is refluxed for three hours. Nearly all of the petroleum ether is then removed by distilling in vacuo to yield a clear amber liquid residue which is dissolved in 100 ml. of ether. The ether solution is washed several times with water and dried over anhydrous sodium sulfate. Removal of the ether by distilling in vacuo leaves 6.4 g. of the basic ester, which is treated in acetone solution with an equivalent amount (3.6 g.) of citric acid monohydrate. The precipitated salt is collected and recrystallized from acetone-petroleum ether (n-hexane fraction) to give 7.1 g. (61%) of white needles, M. P. 78–80° C. (with effervescence); this product is 3-(2-dimethylaminoethylmercapto)-propyl fluorene-9-carboxylate citrate.

Using the above procedure but different basic sulfur-containing alcohols the following compounds are obtained: 3-(3-(1-piperidyl)propylmercapto)-2-propyl fluorene-9-carboxylate citrate, which, on melting, bubbles from 71° C.; and 2-(2-diethylaminoethylmercapto)ethyl fluorene-9-carboxylate citrate, M. P. 95–7° C. (with effervescence).

Example 5

2 - (2 - *diethylaminoethylmercapto*)*ethyl 9,10-dihydroanthracene* - 9 - *carboxylate hydrochloride*.—A mixture of 6.55 g. (0.029 mole) of 9,10-dihydroanthracene-9-carboxylic acid (prepared using n-butyl lithium as described by Burtner and Cusic, J. Am. Chem. Soc., 65, 1582 (1943)), 12 ml. of purified thionyl chloride, and 15 ml. of dry chloroform is refluxed for three hours. The excess thionyl chloride and solvent are removed by distilling in vacuo. The residual 9,10-dihydroanthracene-9-carboxylic acid chloride is dissolved in 30 ml. of dry ether, and to this solution, while being cooled, is slowly added a solution of 5.2 g. (0.0294 mole) of 2-(2-diethylaminoethylmercapto)ethanol in 30 ml. of dry ether. The resulting mixture is allowed to stand at room temperature a few minutes and then placed in the refrigerator overnight. The supernatant liquid is decanted from the precipitated mixture of solid and gum. On triturating this mixture with cold, dry acetone, the gum dissolves leaving a white solid, which is collected and recrystallized from acetone to yield 3.6 g. (33%) of 2-(2-diethylaminoethylmercapto)ethyl 9,10 - dihydroanthracene-9-carboxylate hydrochloride, M. P. 137–7.5° C.

Example 6

3-(2-*diethylaminoethylmercapto*) *propyl cyclohexylphenylacetate citrate*.—After a mixture of 10 g. of cyclohexylphenylacetic acid and 10 ml. of thionyl chloride has been refluxed for three hours on a steam bath, the excess thionyl chloride is removed by distillation, and the residue is distilled in vacuo, yielding 9.57 g. (88%) of cyclohexylphenylacetyl chloride, B. P. 104–7° C. at 0.1 mm. To the 9.57 g. of acid chloride is added, with external cooling in ice water, 7.7 g. of 3 - (2 - diethylaminoethylmercapto) propanol, whereupon there results, after evolution of heat, a semisolid mass. After standing overnight in the refrigerator, the mass is broken up and dissolved in water (about 150 ml.), and the resulting solution is filtered. The filtrate is made alkaline with a 10% aqueous sodium carbonate solution; the resulting alkaline solution is extracted with ether; and the ethereal extract is dried with anhydrous sodium sulfate. After removal of the ether by distillation, the residual oil is dissolved in about 25 ml. of dry acetone and there is added a solution of 8.5 g. of citric acid monohydrate in about 50 ml. of dry acetone. The resulting solution is placed in a refrigerator for several days. The white crystals that separate are filtered, washed with cold, dry acetone, and recrystallized twice from acetone, yielding 17.2 g. of 3 - (2 - diethylaminoethylmercapto) propyl cyclohexylphenylacetate citrate, M. P. 105–9° C. (with effervescence).

Similarly, there can be prepared other basic esters of cyclohexylphenylacetic acid by following the above directions but using other sulfur-containing basic alkanols. Such esters are 3-(2-diethylaminoethylmercapto) - 2 - propyl cyclohexylphenylacetate citrate, M. P. 110–4° C. (with effervescence) and 2-(2-diethylaminoethylmercapto)ethyl cyclohexylphenylacetate citrate, M. P. 102–6° (with effervescence).

We claim:

1. A compound selected from the group consisting of a basic compound having the formula

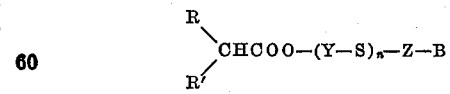

where R and R′ are members of the group consisting of aryl, aralkyl, and cycloalkyl radicals; Y and Z are lower alkylene radicals; n is 1 to 2; and B is a lower aliphatic tertiary-amino group, and addition salts thereof.

2. A compound selected from the group consisting of a basic ester having the formula

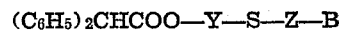

where Y and Z are lower alkylene radicals, and B is a lower aliphatic tertiary-amino group, and addition salts thereof.

3. A compound selected from the group consisting of a basic ester having the formula

where Y and Z are lower alkylene radicals, and B is a lower aliphatic tertiary-amino group, and addition salts thereof.

4. A compound selected from the group consisting of a basic ester having the formula

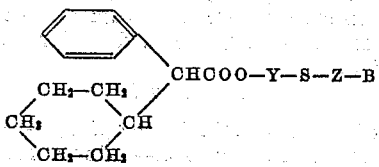

where Y and Z are lower alkylene radicals and B is a lower aliphatic tertiary-amino group, and addition salts thereof.

5. A compound selected from the group consisting of 2-(2-diethylaminoethylmercapto)ethyl diphenylacetate and addition salts thereof.

6. A compound selected from the group consisting of 2-(2-diethylaminoethylmercapto)ethyl dibenzylacetate and addition salts thereof.

7. A compound selected from the group consisting of 2-(2-diethylaminoethylmercapto)ethyl cyclohexylphenylacetate and addition salts thereof.

8. A compound selected from the group consisting of 2-(2-dimethylaminoethylmercapto)ethyl diphenylacetate and addition salts thereof.

9. A compound selected from the group consisting of 3-(2-diethylaminoethylmercapto)propyl diphenylacetate and addition salts thereof.

RAYMOND O. CLINTON.
WOLFGANG HUBER.
GEORGE M. FOHLEN.
STANLEY C. LASKOWSKI.

REFERENCES CITED

The following references are of record in the file of this patent:

UNITED STATES PATENTS

| Number | Name | Date |
|---|---|---|
| 2,079,962 | Miescher et al. | May 11, 1937 |

OTHER REFERENCES

Gilman et al.: "Journ. Pharm. and Exp. Ther.," March 1942, pages 290–307.

Clinton et al.: J. Am. Chem. Soc., vol. 67, page 594 (1945).

Clinton et al.: ibid, vol. 69, page 519 (1947).